US012746765B2

(12) United States Patent
Iwamoto

(10) Patent No.: US 12,746,765 B2
(45) Date of Patent: Sep. 29, 2026

(54) RECORDING DEVICE

(71) Applicant: SEIKO EPSON CORPORATION, Tokyo (JP)

(72) Inventor: Masaharu Iwamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 144 days.

(21) Appl. No.: 18/393,973

(22) Filed: Dec. 22, 2023

(65) Prior Publication Data

US 2024/0208248 A1 Jun. 27, 2024

(30) Foreign Application Priority Data

Dec. 23, 2022 (JP) ................................ 2022-207272

(51) Int. Cl.
*B41J 11/00* (2006.01)

(52) U.S. Cl.
CPC .................................. *B41J 11/007* (2013.01)

(58) Field of Classification Search
CPC .... B41J 11/007; B41J 11/0085; B41J 2/1721; B41J 29/17; B41J 2/1742; B41J 2/01; B41J 11/0065; B41J 15/048; B41J 2/185; B41J 29/38; B41J 2/1728
See application file for complete search history.

(56) References Cited

U.S. PATENT DOCUMENTS

2010/0231676 A1* 9/2010 Miyagi ................ B41J 11/0085 347/104
2018/0236785 A1 8/2018 Sadakuni

FOREIGN PATENT DOCUMENTS

| | | |
|---|---|---|
| JP | 2001347692 | 12/2001 |
| JP | 2006240169 | 9/2006 |
| JP | 2009196185 | 9/2009 |
| JP | 2013-252620 A | 12/2013 |
| JP | 2018-130919 A | 8/2018 |
| JP | 2018-158824 A | 10/2018 |

* cited by examiner

*Primary Examiner* — Jannelle M Lebron
(74) *Attorney, Agent, or Firm* — WORKMAN NYDEGGER

(57) ABSTRACT

A liquid ejection device includes a liquid ejection head configured to eject a liquid onto a medium, a transport belt configured to attract and transport a medium at a position facing the liquid ejection head, and a liquid receiving section that is disposed to the outside of the transport belt in a width direction and that forms a liquid receiving surface that receives liquid ejected to a region separated from the medium, wherein the liquid receiving surface inclines downward from a position adjacent to the transport belt, toward outside in the width direction.

6 Claims, 8 Drawing Sheets

RECORDING DEVICE

The present application is based on, and claims priority from JP Application Serial Number 2022-207272, filed Dec. 23, 2022, the disclosure of which is hereby incorporated by reference herein in its entirety.

BACKGROUND

1. Technical Field

The present disclosure relates to a liquid ejection device that performs recording by ejecting liquid onto a medium.

2. Related Art

JP-A-2013-252620 discloses a configuration in an inkjet recording device for performing borderless recording on a width direction edge of a recording medium while transporting the recording medium using a transport belt.

To be more specific, the ink jet recording device described in JP-A-2013-252620 is provided with four transport belts at predetermined intervals along the width direction, and in a state where the width direction edge of the recording medium is disposed between two adjacent transport belts, ink is ejected between the two adjacent transport belts, thereby performing borderless recording on the width direction edge of the recording medium.

An ink absorber is provided at a position facing the recording head with the transport belt interposed therebetween, and the ink ejected to the outside of the edge of the recording medium, that is, the ink that did not land on the recording medium, is absorbed by the ink absorber.

It is known that since borderless recording is realized by ejecting the ink also to the region beyond the edge of the recording medium, the ink ejected in the region beyond the edge of the recording medium becomes mist and floats, which causes various defects. Therefore, it is preferable to bring the ink absorber as close as possible to the recording medium in the height direction so that the ink ejected to the region to the outside of the edge of the recording medium is immediately absorbed by the ink absorber.

However, since the edge of the recording medium protrudes outward from the transport belt, the protruding section is not supported by the transport belt and so hangs down, and may contact the ink absorber, which would contaminate the recording medium. However, in the ink jet recording device described in JP-A-2013-252620, such a concern is not considered.

SUMMARY

In order to solve the above problem, a recording device of the present disclosure includes a liquid ejection head configured to eject a liquid onto a medium; a transport belt configured to attract and transport the medium at a position facing the liquid ejection head; a liquid receiving section that is disposed to the outside of the transport belt in a width direction, which intersects with a transport direction of the medium by the transport belt, and that forms a liquid receiving surface that receives liquid ejected to a region separated from the medium, wherein the liquid receiving surface inclines downward from a position adjacent to the transport belt, toward the outside in the width direction.

DESCRIPTION OF EMBODIMENTS

Figure 1:
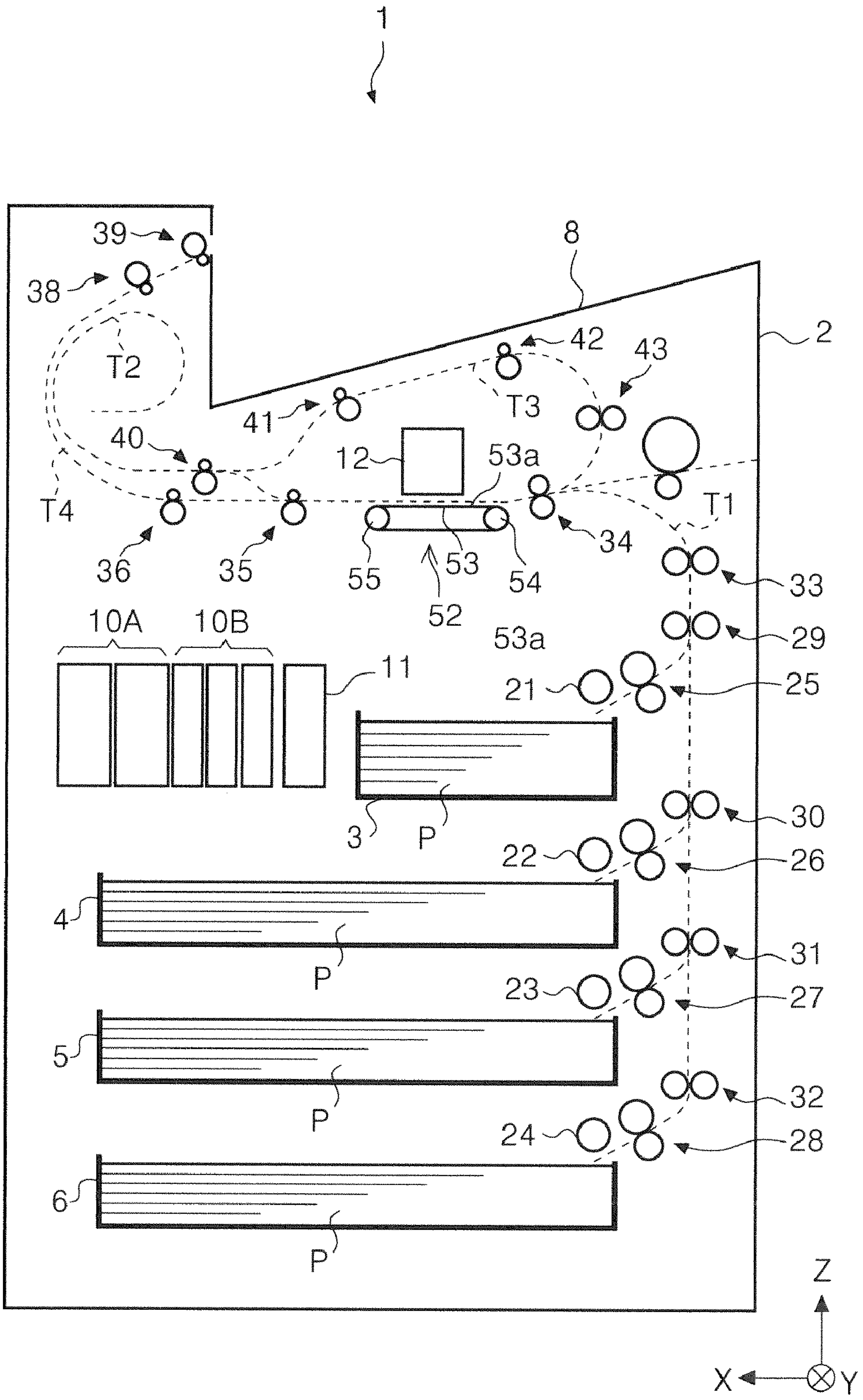
FIG. 1 is a diagram showing an entire medium transport path in a printer.

The present disclosure will be described in general terms.

A liquid ejection device according to a first aspect includes a liquid ejection head configured to eject a liquid onto a medium; a transport belt configured to attract and transport the medium at a position facing the liquid ejection head; a liquid receiving section that is disposed to the outside of the transport belt in a width direction, which intersects with a transport direction of the medium by the transport belt, and that forms a liquid receiving surface that receives liquid ejected to a region separated from the medium, wherein the liquid receiving surface inclines downward from a position adjacent to the transport belt, toward the outside in the width direction.

According to this aspect, since the liquid receiving section is disposed to the outside of the transport belt, and the liquid receiving surface formed by the liquid receiving section inclines downward from a position adjacent to the transport belt toward the outside in the width direction, even when the medium hangs down to the outside of the transport belt, the hanging section is unlikely to contact the liquid receiving surface. By this, even when the liquid receiving surface is brought close to the medium, a section of the medium which protrudes to the outside of the transport belt is unlikely to contact the liquid receiving surface. By bringing the liquid receiving surface close to the medium, the liquid that is ejected to a region separated from the medium rapidly clings to the liquid receiving surface, and thus it is possible to suppress the generation of mist.

As described above, it is possible to achieve both the suppression of contamination due to the medium coming contacting the liquid receiving surface and the suppression of mist generated due to borderless recording.

A second aspect is an aspect according to the first aspect, wherein a position where the liquid receiving surface is adjacent to the transport belt is within a region of the transport belt in a normal direction with respect to an attraction surface where the transport belt attracts the medium.

According to this aspect, since a position where the liquid receiving surface is adjacent to the transport belt is within a region of the transport belt in a normal direction with respect to an attraction surface where the transport belt attracts the medium, the liquid receiving surface is closer to the medium transported by the transport belt, and by this, the generation of mist can be suppressed more favorably.

A third aspect is an aspect according to the second aspect, wherein the liquid receiving section has an auxiliary surface that inclines upward from, as a start point, an edge of the liquid receiving surface at the outside in the width direction, toward the outside in the width direction and a connecting section where the liquid receiving surface and the auxiliary surface are connected to each other inclines downward toward upstream or toward downstream in the transport direction.

According to this aspect, since the liquid receiving section has an auxiliary surface that inclines upward from, as a start point, an edge of the liquid receiving surface at the outside in the width direction, toward the outside in the width direction, the liquid that flows toward the outside in the width direction on the liquid receiving surface is blocked by the auxiliary surface.

In addition, since the connecting section where the liquid receiving surface and the auxiliary surface are connected to each other inclines downward toward upstream or toward downstream in the transport direction, liquid blocked by the auxiliary surface flows upstream or downstream in the transport direction along the connecting section.

By the above, liquid received by the liquid receiving surface can be collected in one place, and liquid received by the liquid receiving surface can be efficiently collected.

Note that this aspect is not limited to the second aspect, and may be according to the first aspect.

A fourth aspect is an aspect according to the third aspect, further including a liquid collection tray for collecting liquid guided by the connecting section.

According to this aspect, the liquid guided by the connecting section can be collected by the liquid collection tray. Since the liquid is guided upstream or downstream in the transport direction by the connecting section and collected, it is possible to suppress an increase in the size of the liquid collection tray along the transport direction.

A fifth aspect is an aspect according to the third aspect, wherein an outside edge of the auxiliary surface in the width direction is located at a position higher than a height position of a head surface of the liquid ejection head.

According to this aspect, since an outside edge of the auxiliary surface in the width direction is located at a position higher than a height position of a head surface of the liquid ejection head, when the liquid ejected from the liquid ejection head becomes mist, it is possible to suppress, by the auxiliary surface, the mist from flowing toward the outside in the width direction.

Note that this aspect is not limited to the third aspect and may be according to the fourth aspect.

A sixth aspect is an aspect according to any one of the first to fifth aspects, wherein the liquid receiving section is provided on both sides of the transport belt in the width direction.

According to this aspect, since the liquid receiving section is provided on both sides of the transport belt in the width direction, it is possible to perform borderless recording on both edges of the medium in the width direction, and when performing borderless recording, it is possible to obtain the operations and effects of any one of the first to fifth aspects described above.

A seventh aspect is an aspect according to any one of the first to fifth aspects, wherein a belt unit, which includes the transport belt, is configured to be movable in the width direction by receiving power of a drive source and while a first medium whose width direction size is smaller than a size of the transport belt is being transported, a control section configured to control the drive source controls the drive source to move the transport belt such that one edge of the first medium in the width direction is positioned to the outside of the transport belt.

According to this aspect, while a first medium whose width direction size is smaller than the size of the transport belt is being transported, the control section controls the drive source to move the transport belt such that one edge of the first medium in the width direction is positioned to the outside of the transport belt. Therefore, it is possible to perform borderless recording on one edge region of the first medium in the width direction.

An eighth aspect is an aspect according to the seventh aspect, wherein the liquid receiving section is provided on both sides of the transport belt in the width direction and the transport belt is movable between a first movement position where one edge of the first medium in the width direction is positioned outside the transport belt and a second movement position where the other edge of the first medium in the width direction is positioned to the outside of the transport belt.

According to the aspect, in addition to the liquid receiving section being provided on both sides of the transport belt in the width direction, the transport belt is movable between the first movement position and the second movement position. By this, it is possible to perform borderless recording on one edge region or the other edge region of the first medium in the width direction.

Hereinafter, the present disclosure will be specifically described.

Hereinafter, an ink jet printer 1 which performs recording by ejecting ink, which is an example of liquid, onto a recording sheet, which is an example of a medium, will be described as an example of a liquid ejection device. Hereinafter, the inkjet printer 1 will be referred to simply as a printer 1.

An X-Y-Z coordinate system shown in each figure is an orthogonal coordinate system, wherein a Y-axis direction is a width direction, which intersects a medium transport direction, and is the depth direction of the device. In this embodiment, of the side surfaces constituting the periphery of an device main body 2, a side surface in the +Y direction is a back surface, and a side surface in the −Y direction is a front surface.

An X-axis direction is a device width direction and, as viewed from an operator of the printer 1, a +X direction is to the left side and a −X direction is to the right side. The −X direction is a direction in which sheets are fed from the sheet cassettes, as will be described later.

A Z-axis direction is a vertical direction, that is, a device height direction, and a +Z direction is an upward direction and a −Z direction is a downward direction.

In the following description, the direction in which the recording sheet is fed may be referred to as "downstream" and the opposite direction as "upstream". A sheet transport path is indicated in FIG. 1 by broken line. A paper sheet is transported in the printer 1 through the sheet transport path indicated by broken line.

The printer 1 is provided with a line head 12 (to be described later) in the device main body 2 and a plurality of sheet cassettes along the vertical direction are provided at the bottom portion of the device main body 2, specifically, a first sheet cassette 3, a second sheet cassette 4, a third sheet cassette 5, and a fourth sheet cassette 6. The reference character P indicates recording sheets accommodated in the sheet cassettes.

A pickup roller is provided for each sheet cassette to feed the accommodated recording sheets in the −X direction. Reference characters 21, 22, 23 and 24 indicate pickup rollers provided to the sheet cassettes.

For each sheet cassette, there is a feed roller pair that feeds the recording sheet, fed by the pickup roller, further downstream. Reference characters 25, 26, 27 and 28 indicate feed roller pairs provided to the sheet cassettes.

Note that in the following description, unless otherwise specified, a "roller pair" is configured by a drive roller driven by a motor (not shown) and a driven roller in contact with and driven by the drive roller.

The reference character T1 indicates a transport path of recording sheets that were fed out from the sheet cassettes and that reach a transport roller pair 34. A recording sheet fed out from the first sheet cassette 3 receives a feed force from transport roller pairs 29 and 33 and is fed to the transport roller pair 34. A recording sheet fed out from the second sheet cassette 4 receives a feed force from the transport roller pairs 30, 29, and 33 and is fed to the transport roller pair 34. A recording sheet fed out from the third sheet cassette 5 receives a feed force from the transport roller pairs 31, 30, 29, and 33 and is fed to the transport roller pair 34. A recording sheet fed out from the fourth sheet cassette 6 receives a feed force from the transport roller pairs transport roller pairs 32, 31, 30, 29, and 33 and is fed to the transport roller pair 34.

A recording sheet receiving the feeding force from the transport roller pairs 34 is fed between the line head 12, which is an example of a liquid ejection head, and the transport belt 53, that is, to a recording position facing the line head 12.

The line head 12 ejects ink, which is an example of liquid, onto a surface of the recording sheet to perform recording. The line head 12 is an ink ejection head configured so that nozzles for ejecting ink cover an entire area of the sheet width direction, and is configured as an ink ejection head capable of recording over the entire area in the sheet width direction without moving in the sheet width direction. However, the ink ejection head is not limited to this type, and may be mounted on a carriage and eject ink while moving in the sheet width direction.

The transport belt 53 is an endless belt wound around a first roller 54 and a second roller 55, and is circulated by the first roller 54 being driven by a motor (not shown). A recording sheet is transported to a position facing the line head 12 while being attracted to the attraction surface 53*a* of the transport belt 53. An electrostatic attraction method is used in this embodiment for attracting the recording sheet to the transport belt 53. A section for charging the transport belt 53 will be described later.

A recording sheet recorded on its first surface by the line head 12 is sent by a transport roller pair 35, which is located downstream of the transport belt 53, toward either a transport roller pair 36 or a transport roller pair 40. A path switching flap (not shown) is provided downstream of the transport roller pair 35. With this path switching flap, a recording sheet that receives a feed force from the transport roller pair 35 is sent to either the transport roller pair 36 or the transport roller pair 40.

When recording is not performed on both the first surface and the opposite second surface of a recording sheet, that is, when double-sided recording is not performed, the recording sheet is sent from the transport roller pair 35 to the transport roller pair 36, and is discharged through a discharge path T4 toward a discharge tray 8. A transport roller pair 38 and a transport roller pair 39 are provided in the discharge path T4.

When recording is performed on both the first surface and the opposite second surface of a recording sheet, that is, when double-sided recording is performed, the recording sheet is sent from the transport roller pair 35 to the transport roller pair 40, and enters a switchback path T2. Afterward, the rotation direction of the transport roller pair 40 is switched, and the recording sheet enters an inversion path T3 and is sent to the transport roller pair 34 by transport roller pairs 41, 42, and 43.

Reference characters 10A and 10B are ink containers, as liquid containers, which contain ink before ejection. The ink to be ejected from the line head 12 is supplied from the ink containers 10A and 10B to the line head 12 through tubes (not shown).

The reference character 11 indicates a waste liquid container that stores, as waste liquid, ink that was ejected for maintenance from the line head 12 to a cap section (not shown). Ink as waste liquid that was discharged toward the cap section (not shown) for maintenance is sent from the cap section (not shown) to the waste liquid container 11 through a tube (not shown).

Figure 2:
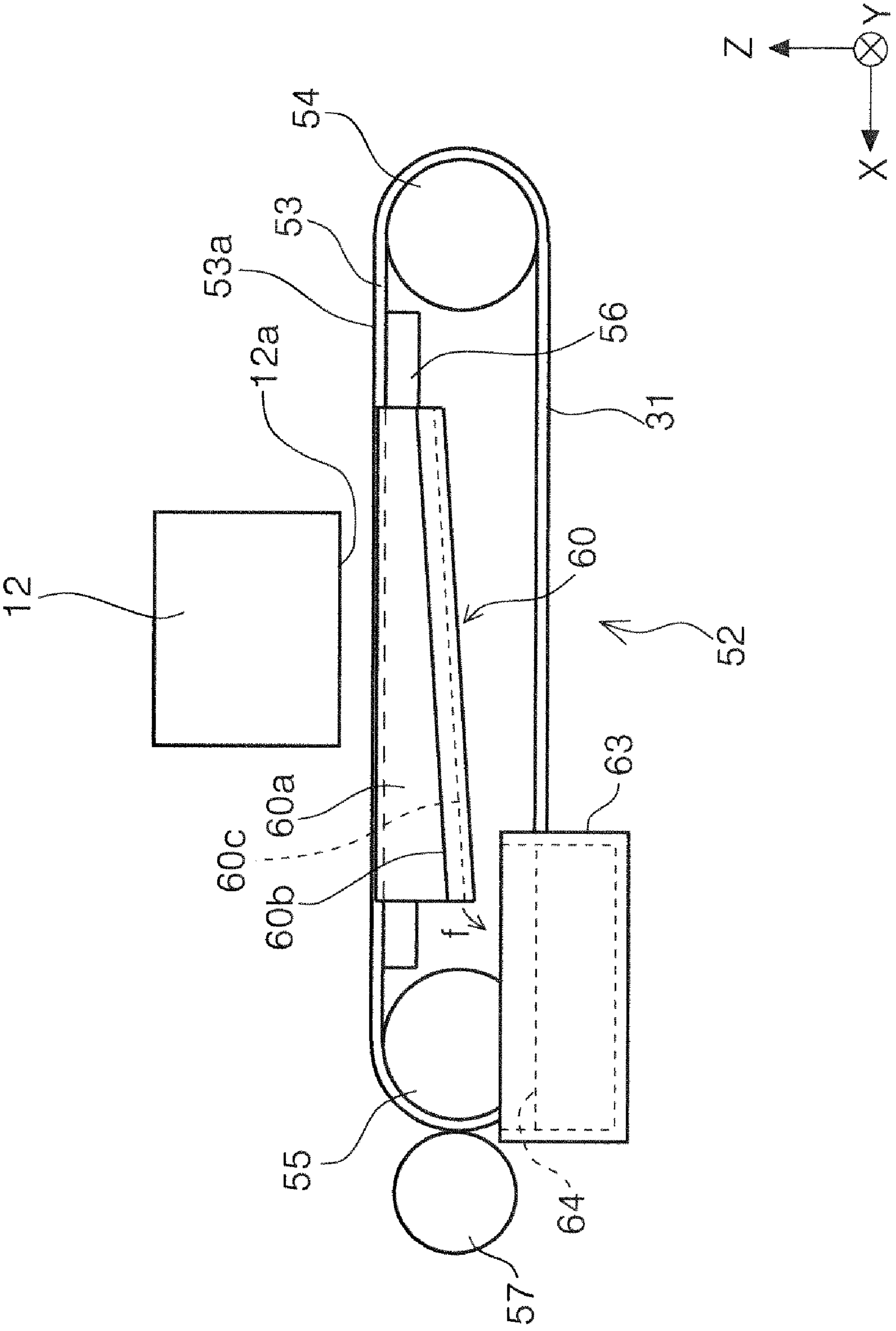
FIG. 2 is a side view of a belt unit.

Next, the belt unit 52, including the transport belt 53, will be described with reference to FIG. 2 and the subsequent drawings. Note that hereinafter, the Y-axis direction, which is the sheet width direction, may be simply referred to as a width direction. Further in the +Y direction from the +Y direction edge of the transport belt 53 and further in the −Y direction from the −Y direction edge of the transport belt 53 may be referred to as "outside".

The belt unit 52 includes a first roller 54 and a second roller 55 around which the transport belt 53 is wound. The first roller 54 is driven in the counterclockwise direction in the drawing by a motor (not shown), and by this the transport belt 53 circulates and the attraction surface 53*a* moves in the +X direction.

A backup plate 56 is provided to the inside of the transport belt 53. The section of the transport belt 53 facing the line head 12 is supported by the backup plate 56.

The belt unit 52 includes a charging roller 57. The charging roller 57 is a roller that contacts an outer surface of the transport belt 53 and rotates driven by the rotation of the transport belt 53. A DC voltage is applied to the charging roller 57 by a power supply device (not shown), and by this the charging roller 57 supplies an electric charge to the area where the charging roller 57 is in contact with the transport belt 53. As a result, the outer surface of the transport belt 53 is charged to a positive polarity, and the outer surface of the transport belt 53 becomes the attraction surface that attracts the recording sheet.

Note that in the present embodiment, the belt unit 52 adopts an electrostatic attraction method, but may adopt another method such as a method of attraction by air suction.

A liquid receiving section 60 is provided on both sides of the backup plate 56 in the width direction. Note that in this embodiment, the liquid receiving section 60 is provided on the backup plate 56, but may be provided on another member.

Figure 3:
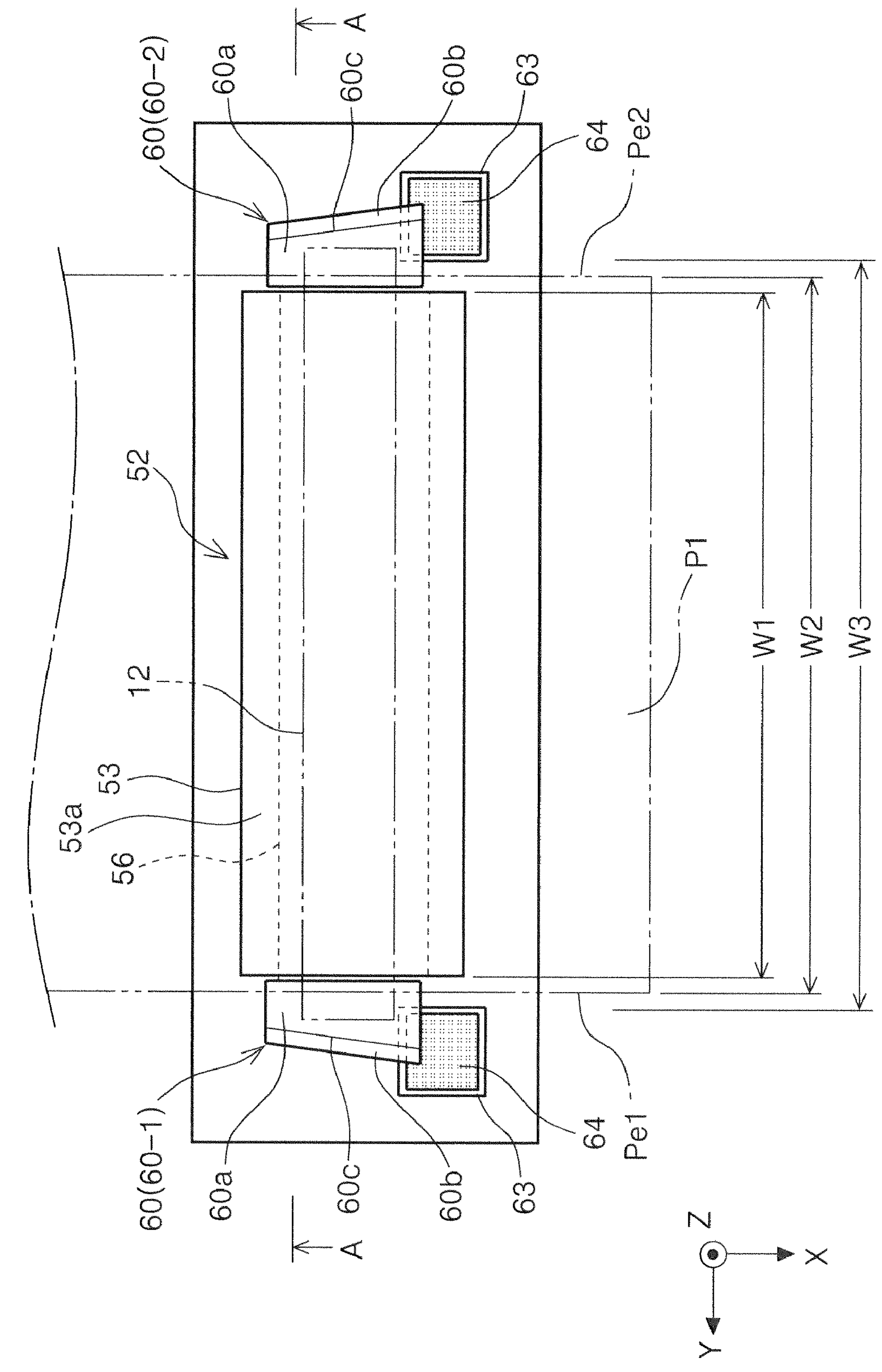
FIG. 3 is a plan view of the belt unit.

As shown in FIG. 3, the liquid receiving section 60 is disposed to the outside of the transport belt 53 in the width direction. The liquid receiving section 60 is a portion where a liquid receiving surface 60*a* receives ink that was ejected to the outside of the region of the recording sheet while borderless recording is being performed on both edges of the recording sheet.

The liquid receiving section 60*a* can be formed of various materials, but is formed of a polyethylene terephthalate (PET) sheet as an example in the present embodiment.

Note that the liquid receiving surface 60*a* may have an ink absorbing property. For example, an ink absorbing sheet may be disposed on a PET sheet.

Hereinafter, the liquid receiving section 60 will be described in more detail. In the embodiment, the liquid receiving section 60 includes a liquid receiving section 60-1, which is positioned to the outside of the transport belt 53 in the +Y direction, and a liquid receiving section 60-2, which is positioned on the outside of the transport belt 53 in the −Y direction. Hereinafter, when the liquid receiving section 60-1 and the liquid receiving section 60-2 are not distinguished from each other, they are collectively referred to as the liquid receiving section 60.

In FIG. 3, the reference character P1 indicates a recording sheet having a width direction size W2, reference sign Pe1 indicates the edge of the recording sheet P1 in the +Y direction, and reference sign Pe2 indicates the edge of the recording sheet SL in the −Y direction. The width direction size W2 of the recording sheet P1 is larger than the width direction size W1 of the transport belt 53 in the width direction. The reference character W3 denotes the width direction size of the region recordable by the line head 12, and the size W3 is larger than the width direction size W2 of the recording sheet P1.

Under such a condition, the ink is ejected not only to the region of the recording sheet P1 but also to areas to the outside of the edges Pe1 and Pe2, so that borderless recording can be performed on both edges in the width direction.

The edges Pe1 and Pe2 of the recording sheet P1 are arranged at positions that, because of the size W2, face the liquid receiving surface 60*a*. The liquid receiving surface 60*a* receives the ink ejected to regions to the outside of the edges Pe1 and Pe2 of the recording sheet P1.

The liquid receiving surface 60*a* includes the entire region of the line head 12 in the X-axis direction, that is, in the sheet transport direction.

Figure 4:
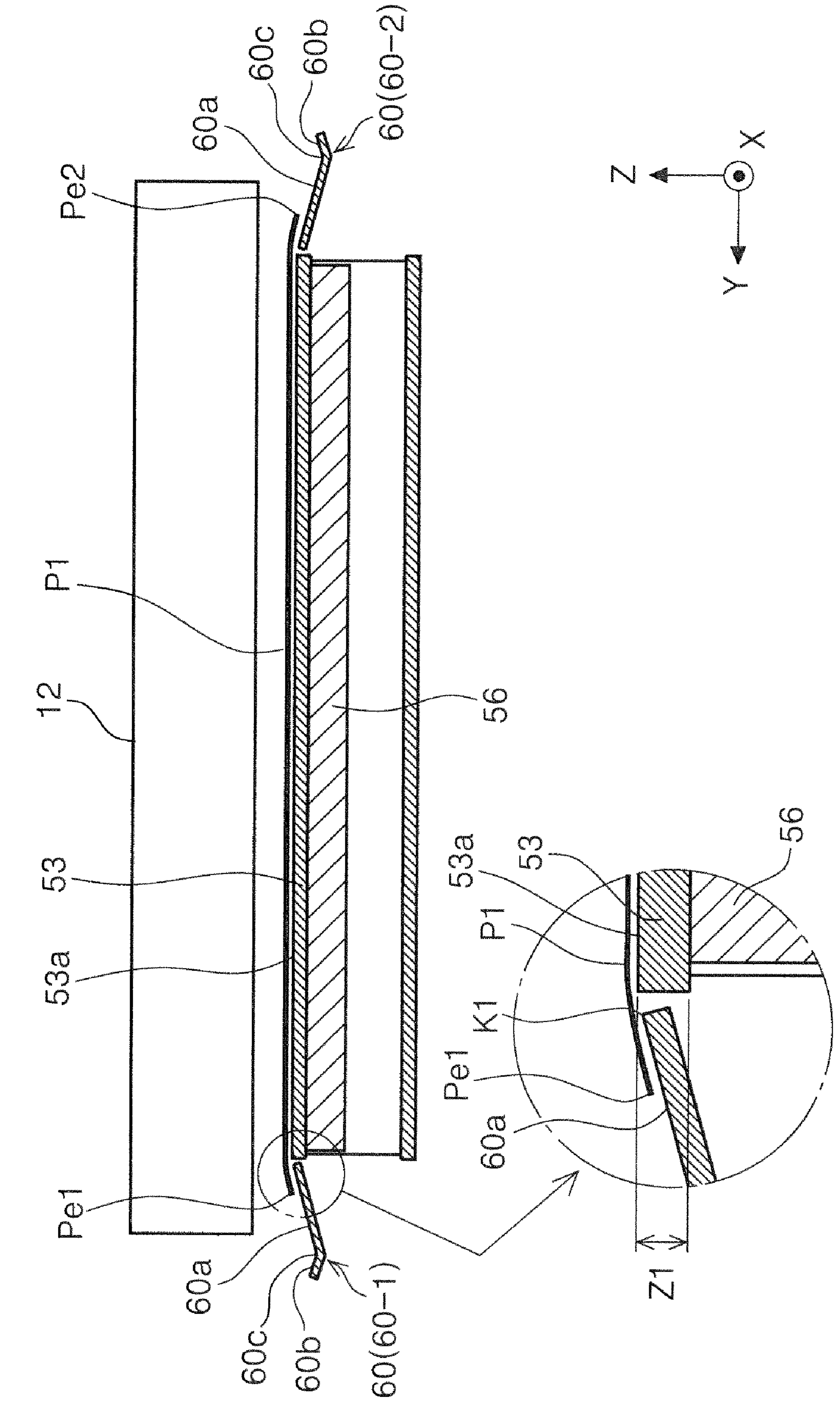
FIG. 4 is a cross-sectional view of the belt unit taken along line A-A in FIG. 3.

As particularly shown in the enlarged view in FIG. 4, the liquid receiving surface 60*a* inclines downward from a position K1 adjacent to the transport belt 53, toward to the outside in the width direction. The inclination angle of the downward inclination is formed so as to be uniform across the sheet transport direction. By this, the gap in the height direction between the edges Pe1 and Pe2 and the liquid receiving surface 60*a* is easy to be made uniform over the sheet transport direction.

Since the liquid receiving surface 60*a* inclines downward toward the outside in the width direction, the ink received by the liquid receiving surface 60*a* flows in the outward direction.

An auxiliary surface 60*b* is connected to the outer edge section of the liquid receiving surface 60*a*. The auxiliary surface 60*b* is formed so as to incline upward starting from the outer end section of the liquid receiving surface 60*a*, toward the outside in the width direction. As shown in FIG. 2, a connecting section 60*c* where the liquid receiving surface 60*a* and the auxiliary surface 60*b* are connected to each other is formed so as to incline downward toward the downstream side in the sheet transport direction. By this, the ink that flowed over the liquid receiving surface 60*a* outward in the width direction flows downstream in the sheet transport direction along the inclination of the connecting section 60, and flows downward as indicated by an arrow f in FIG. 2.

A liquid collection tray 63 is disposed at a position where the ink flows down, that is, below the connecting section 60 in the sheet transport direction, and the ink that flows down as indicated by the arrow f is collected by the liquid collection tray 63.

A liquid absorbent material 64 that absorbs ink is provided inside the liquid collection tray 63, and the ink is held by the liquid absorbing material 64.

As described above, the liquid receiving section 60 is disposed to the outside of the transport belt 53, and the liquid receiving surface 60*a* of the liquid receiving section 60 inclines downward from the position K1 adjacent to the transport belt 53 toward the outside in the width direction. Therefore, even when a section of the recording sheet that protrudes outward from the transport belt 53 hangs down as shown in FIG. 4, the portion that hangs down is unlikely to contact the liquid receiving surface 60*a*. By this, even when the liquid receiving surface 60*a* is brought close to the recording sheet, a section of the recording sheet that protrudes to the outside of the transport belt 53 is unlikely to contact the liquid receiving surface 60*a*. Then, by bringing the liquid receiving surface 60*a* close to the recording sheet, the ink ejected to the region separated from the recording sheet quickly clings to the liquid receiving surface 60*a*, and by this, the generation of mist can be suppressed.

By the above, it is possible to achieve both the suppression of contamination due to the recording sheet contacting the liquid receiving surface 60*a* and the suppression of mist generated due to borderless recording.

In the present embodiment, as shown in the enlarged view of FIG. 4, the position K1 where the liquid receiving surface 60*a* is adjacent to the transport belt 53 is within the region Z1 of the transport belt 53 in the normal direction (Z-axis direction) with respect to the attraction surface 53*a* where the transport belt 53 attracts the recording sheet.

By this, the liquid receiving surface 60*a* comes closer to the recording sheet transported by the transport belt 53, and by this, the generation of mist can be suppressed more favorably.

Note that the position K1 and the upper end of the region Z1 may be at the same position in the Z-axis direction. The position K1 and the lower end of the region Z1 may be at the same position in the Z-axis direction.

However, the position K1 where the liquid receiving surface 60*a* is adjacent to the transport belt 53 may be lower than the region Z1 of the transport belt 53.

The liquid receiving section 60 has the auxiliary surface 60*b* that inclines upward from, as a start point, an edge of the liquid receiving surface 60*a* that is to the outside in the width direction, toward the outside in the width direction. By this, ink flowing outward in the width direction on the liquid receiving surface 60*a* is blocked by the auxiliary surface 60*b*. In addition, since the connecting section 60*c* where the liquid receiving surface 60*a* and the auxiliary surface 60*b* are connected to each other inclines downward toward downstream in the transport direction, the ink blocked by the auxiliary surface 60*b* flows toward downstream in the transport direction.

As described above, the ink received by the liquid receiving surface 60*a* can be collected in one place, and the ink received by the liquid receiving surface 60*a* can be efficiently collected.

Note that in this embodiment, the connecting section 60*c* inclines downward toward downstream in the transport direction, but may incline downward toward upstream in the transport direction.

The auxiliary surface 60*b* may be omitted, and the ink flowing outward in the width direction on the liquid receiving surface 60*a* may drip from the outer edge section of the liquid receiving surface 60*a*. In this case, the liquid collection tray 63 is desirably formed so as to cover the entire area of the liquid receiving surface 60*a* in the transport direction.

In this manner, the ink guided by the connecting section 60*c* can be collected by the liquid collection tray 63. In the configuration in which the connecting section 60*c* inclines downward toward downstream or upstream in the transport direction, the ink is guided downstream or upstream in the transport direction by the connecting section 60*c* and collected. By this, it is possible to suppress an increase in size of the liquid collection tray 63 along the transport direction.

In the embodiment, since the liquid receiving section 60 is provided on both sides of the transport belt 53 in the width direction, it is possible to perform borderless recording on both edges of the recording sheet in the width direction.

Figure 5:
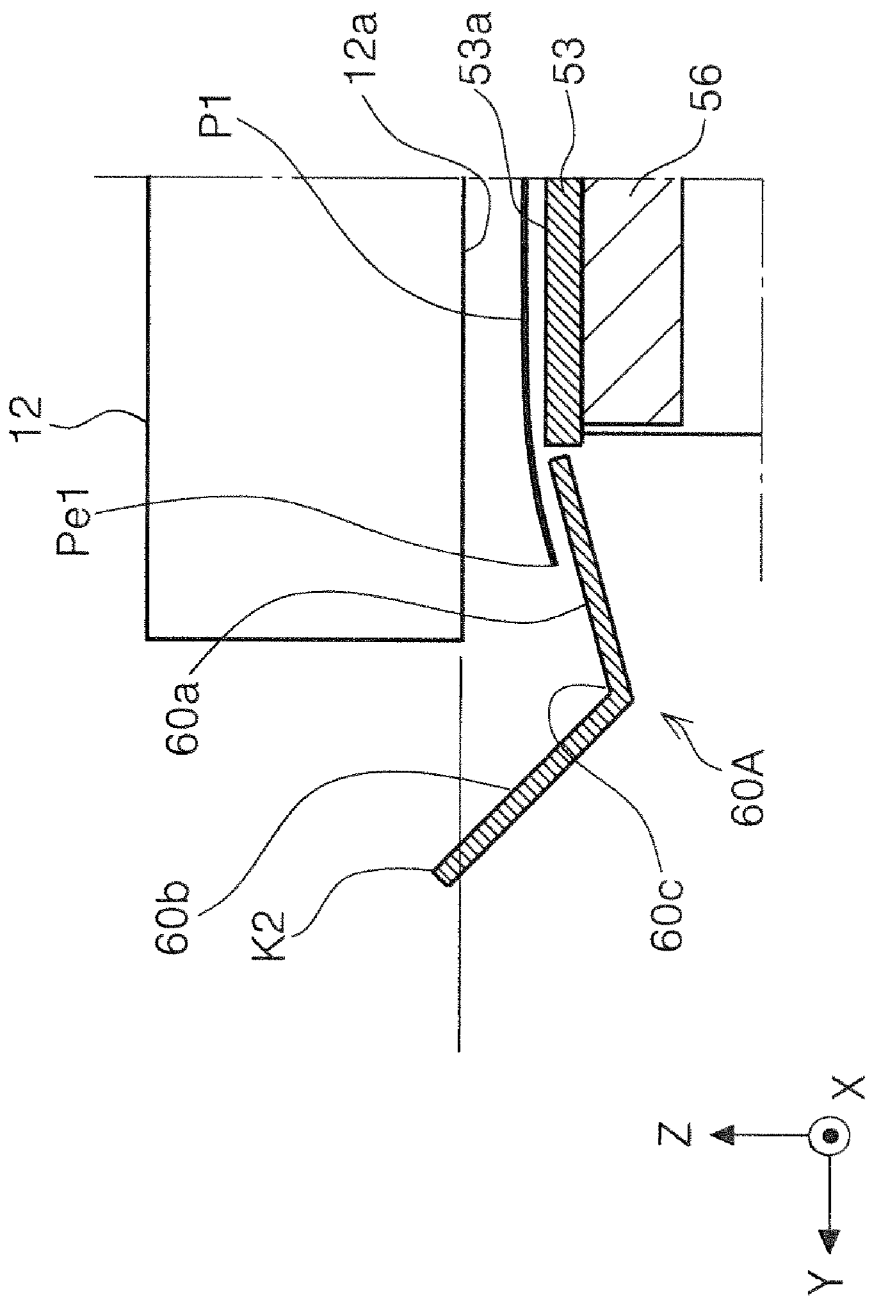
FIG. 5 is a view showing another embodiment of a liquid receiving section.

Note that it is also desirable that, as in the liquid receiving section 60A according to another embodiment shown in FIG. 5, the auxiliary surface 60*b* be configured such that the edge K2 to the outside in the width direction is located at a position higher than the height position of the head surface 12*a* of the line head 12. By this, when the ink ejected from the line head 12 becomes mist, the auxiliary surface 60*b* enable suppressing the mist from flowing toward the outside in the width direction.

Note that it is desirable that the edge K2 of the auxiliary surface 60*b* be located at a position higher than the height position of the head surface 12*a* over the entire region of the line head 12 in the sheet transport direction.

Still another embodiment will be described with reference to FIGS. 6 and 7.

Figure 6:
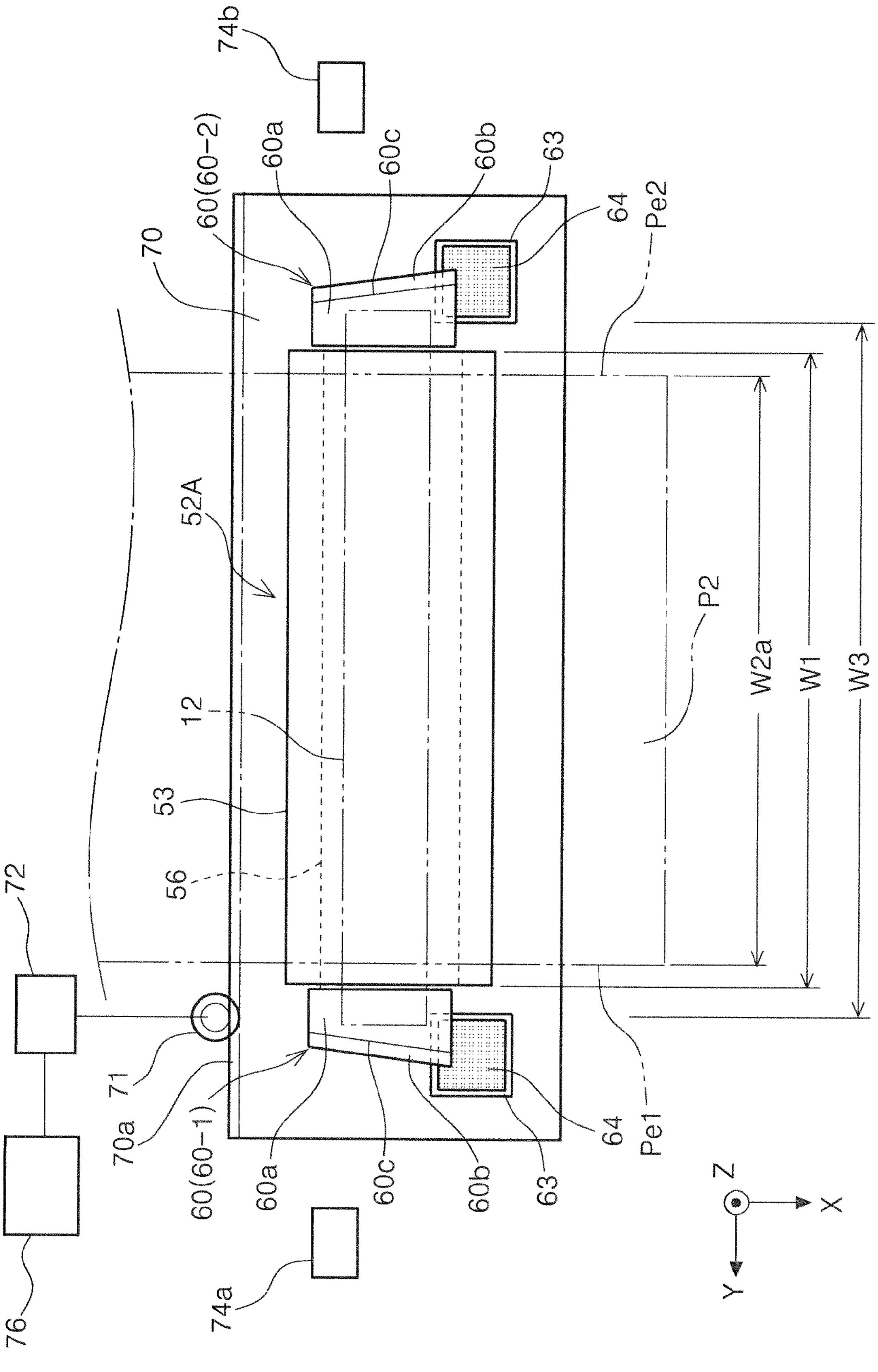
FIG. 6 is a plan view of a belt unit according to another embodiment.
Figure 7:
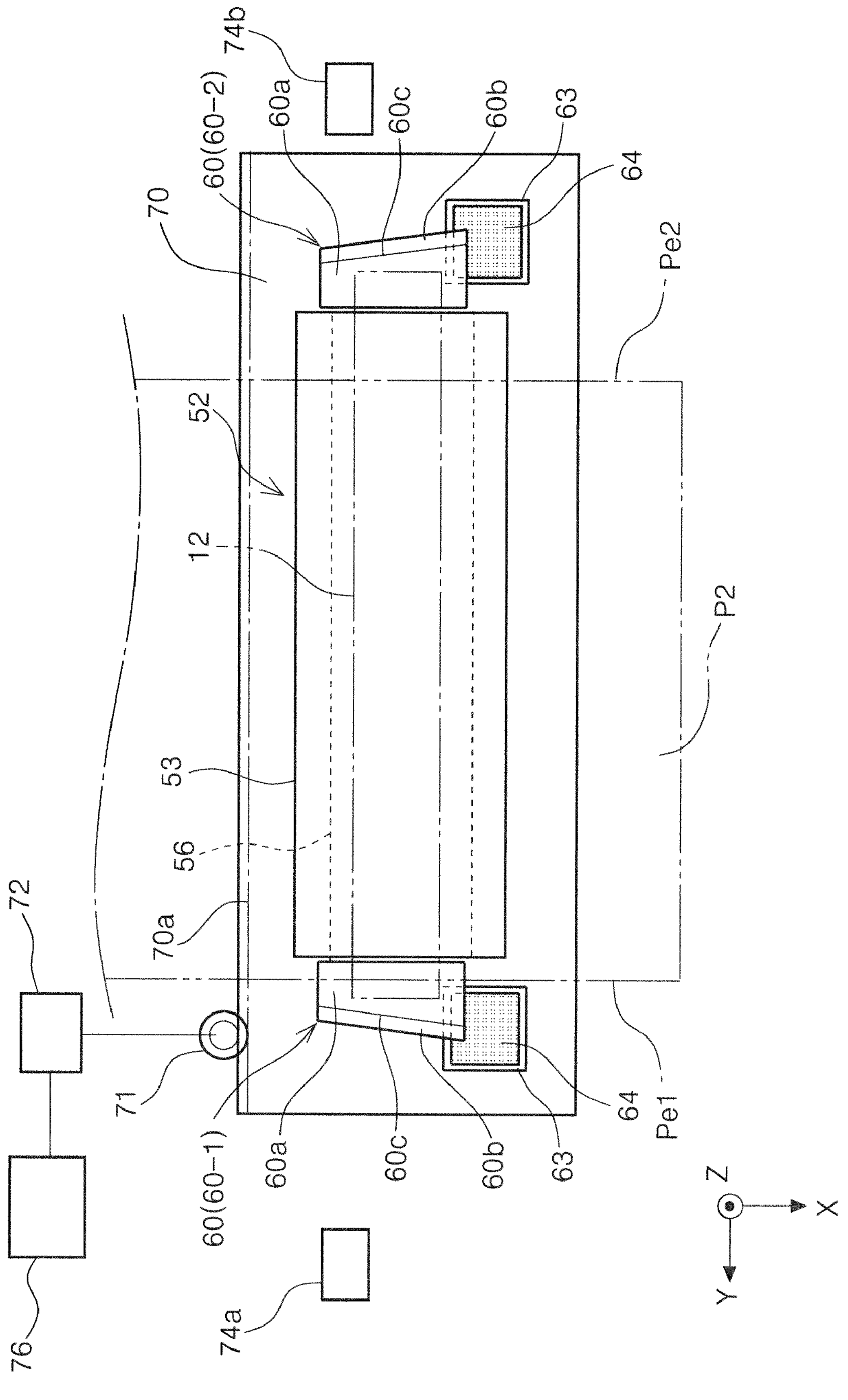
FIG. 7 is a plan view of a belt unit according to another embodiment.

The belt unit 52A shown in FIGS. 6 and 7 is provided on the base member 70. The base member 70 is provided so as to be movable in the width direction along a guide section (not shown). A rack section 70*a* is formed along the width direction on the base member 70. A pinion 71 meshes with the rack section 70*a*, and the rack section 70*a* and the pinion 71 constitute a rack and pinion mechanism.

The pinion 71 is rotationally driven by a motor 72, which serves as a drive source. The motor 72 is controlled by a control section 76. The control section 76 is a control device including a CPU, a nonvolatile memory, and the like (none of which are shown), and performs various kinds of control by executing a program held in the nonvolatile memory.

With such a configuration, the belt unit 52A moves in the width direction by receiving the power of the motor 72.

A restricting section 74*a* is provided in the +Y direction with respect to the base member 70. The movement limit of the base member 70 in the +Y direction is restricted by the base member 70 abutting the restricting section 74*a*.

A restricting section 74*b* is provided in the −Y direction with respect to the base member 70. The movement limit of the base member 70 in the −Y direction is restricted by the base member 70 abutting the restricting section 74*b*. The control section 76 can grasp the current position of the base member 70 based on an increase in the driving current value of the motor 72 when the base member 70 contacts the restricting section 74*a* or the restricting section 74*b*. The motor 72 is provided with an encoder (not shown) and the control section 76 can position the base member 70, that is, the belt unit 52A, at a desired position based on information transmitted from the encoder.

The reference character P2 denotes a first recording sheet having a width direction size W2*a* that is smaller than the size W1 of the transport belt 53. When the first recording sheet P2 is to be transported, the control section 76 controls the motor 72 to move the belt unit 52A (transport belt 53) so that, as shown in FIG. 7, the one edge Pe1 in the width direction of the first recording sheet P2 is positioned to the outside of the transport belt 53.

By this, it is possible to perform borderless recording on one side end region in the width direction of the first recording sheet P2.

Figure 8:
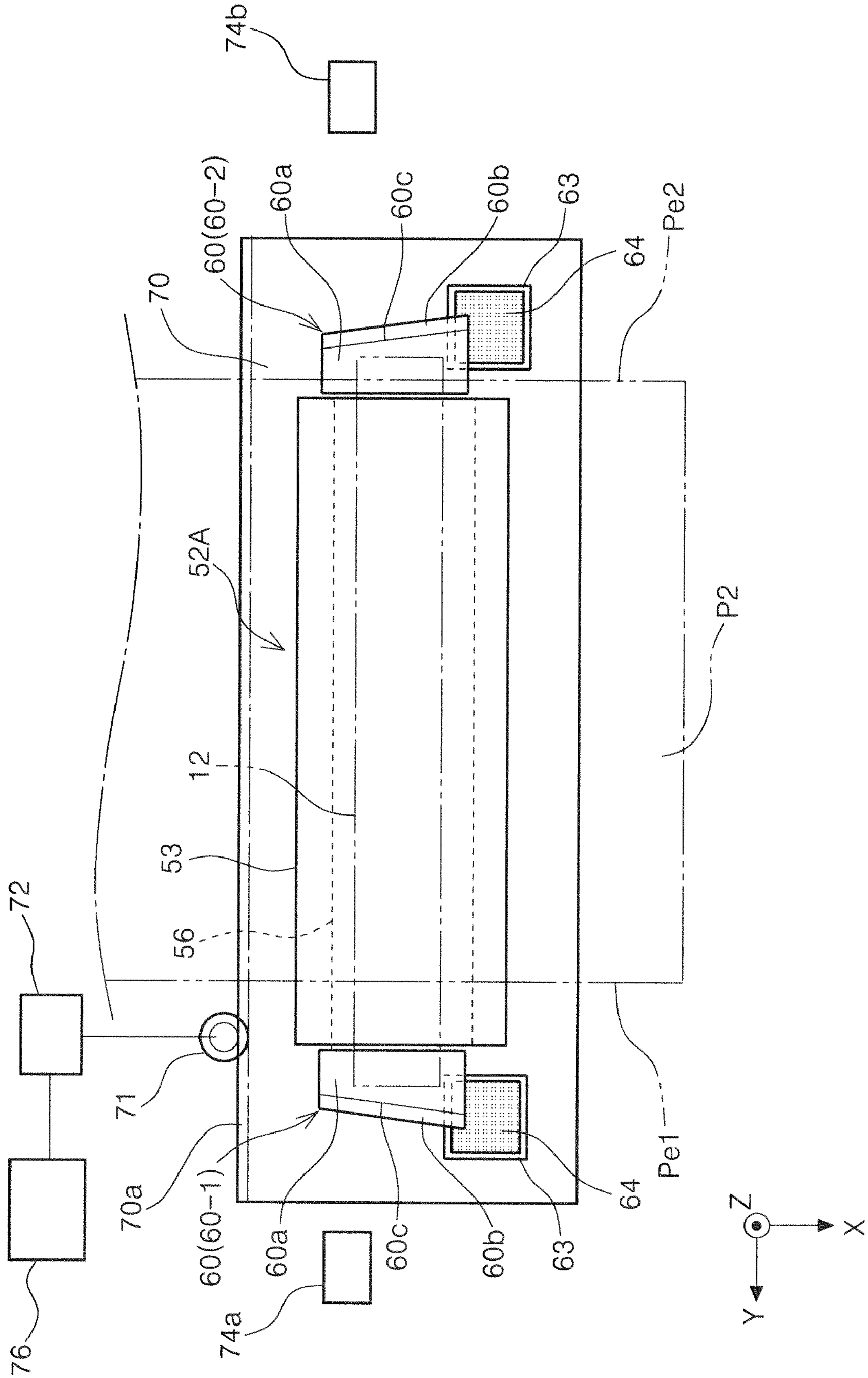
FIG. 8 is a plan view of a belt unit according to another embodiment.

Note that the position of the belt unit 52A (transport belt 53) shown in FIG. 7 may be set as the first movement position of the transport belt 53, and the belt unit 52A (transport belt 53) may be moved to the second movement position shown in FIG. 8. By this, the other edge Pe2 of the first recording sheet P2 in the width direction can be arranged to the outside of the transport belt 53, and borderless recording can be executed in the other side end region.

Note that in the above-described configuration, borderless recording can be performed only on one edge region of the recording sheet. For this reason, it may be configured such that a user can set whether to perform borderless recording on the edge region in the +Y direction or the edge region in the −Y direction of the recording sheet via an operation section (not shown) included in the printer 1.

Instead of such a configuration, the control section 76 may compare the recording duties assuming that recording is performed in the edge region in the +Y direction and in the edge region in the −Y direction of the image data, and may perform borderless recording at the side where the recording duty is smaller. By doing this, it is possible to reduce the amount of ink ejected to a region separated from the recording sheet, and it is possible to suppress floating ink mist. Here, recording duty is a ratio at which ink covers a unit area of the recording surface, and for example, in a case of a recording duty of 50%, 50% of the unit area of the recording surface is covered with ink.

When performing borderless recording, a part of the image data is not recorded and is discarded. Therefore, when a part of the image data at the side with a high recording duty is not recorded and is discarded, the loss of the image data is likely to be conspicuous. Accordingly, on the basis of this viewpoint, the recording duties may be compared between the edge region in the +Y direction and the edge region in the −Y direction of the image data, and borderless recording may be performed on the side where the recording duty is larger.

In the above-described embodiment, the transport belt 53 is moved with respect to the recording sheet, but the recording sheet may be moved with respect to the transport belt 53. For example, an edge guide (not shown) included in any one of the first sheet cassette 3, the second sheet cassette 4, the third sheet cassette 5, and the fourth sheet cassette 6 may be configured to be movable in the width direction, and the recording sheet may be moved with respect to the transport belt 53. A shift mechanism that shifts the recording sheet in the width direction on the sheet transport path may be employed.

The present disclosure is not limited to the embodiments described above, and various modifications can be made within the scope of the disclosure described in the claims, and it is needless to say that these are also included in the scope of the present disclosure.

What is claimed is:

1. A liquid ejection device comprising:

a liquid ejection head configured to eject a liquid onto a medium;

a transport belt configured to attract and transport the medium at a position facing the liquid ejection head; and a liquid receiving section that is disposed to the outside of the transport belt in a width direction, which intersects with a transport direction of the medium by the transport belt, and that forms a liquid receiving surface that receives liquid ejected to a region separated from the medium, wherein the liquid receiving surface inclines downward from a position adjacent to the transport belt, toward the outside in the width direction, a position where the liquid receiving surface is adjacent to the transport belt is within a region of the transport belt in a normal direction with respect to an attraction surface where the transport belt attracts the medium, the liquid receiving section has an auxiliary surface that inclines upward from, as a start point, an edge of the liquid receiving surface at the outside in the width direction, toward the outside in the width direction, and a connecting section where the liquid receiving surface and the auxiliary surface are connected to each other inclines downward toward upstream or toward downstream in the transport direction.

2. The liquid ejection device according to claim 1, further comprising:

a liquid collection tray for collecting liquid guided by the connecting section.

3. The liquid ejection device according to claim 1, wherein an outside edge of the auxiliary surface in the width direction is located at a position higher than a height position of a head surface of the liquid ejection head.

4. The liquid ejection device according to claim 1, wherein the liquid receiving section is provided on both sides of the transport belt in the width direction.

5. A liquid ejection device comprising:

a liquid ejection head configured to eject a liquid onto a medium;

a transport belt configured to attract and transport the medium at a position facing the liquid ejection head; and a liquid receiving section that is disposed to the outside of the transport belt in a width direction, which intersects with a transport direction of the medium by the transport belt, and that forms a liquid receiving surface that receives liquid ejected to a region separated from the medium, wherein the liquid receiving surface inclines downward from a position adjacent to the transport belt, toward the outside in the width direction, a belt unit, which includes the transport belt, is configured to be movable in the width direction by receiving power of a drive source, and while a first medium whose width direction size is smaller than a size of the transport belt is being transported, a control section configured to control the drive source controls the drive source to move the transport belt such that one edge of the first medium in the width direction is positioned to the outside of the transport belt.

6. The liquid ejection device according to claim 5, wherein the liquid receiving section is provided on both sides of the transport belt in the width direction and the transport belt is movable between a first movement position where one edge of the first medium in the width direction is positioned outside the transport belt and a second movement position where the other edge of the first medium in the width direction is positioned to the outside of the transport belt.

* * * * *